Jan. 4, 1966 F. V. COJA 3,227,367
REMOTE CONTROL SYSTEM FOR MANIPULATING A BUSINESS MACHINE
Filed Aug. 19, 1963 6 Sheets-Sheet 1

INVENTOR
FELIX V. COJA
BY Cushman, Darby & Cushman
ATTORNEYS

INVENTOR
FELIX V. COJA

BY Cushman, Darby & Cushman
ATTORNEYS

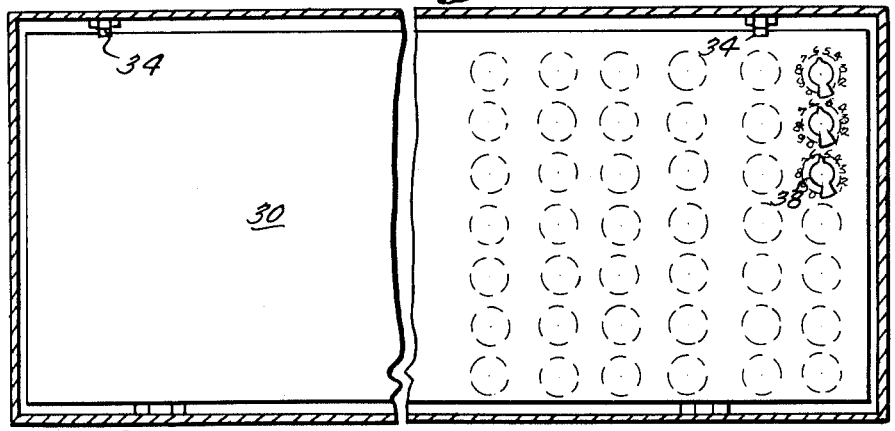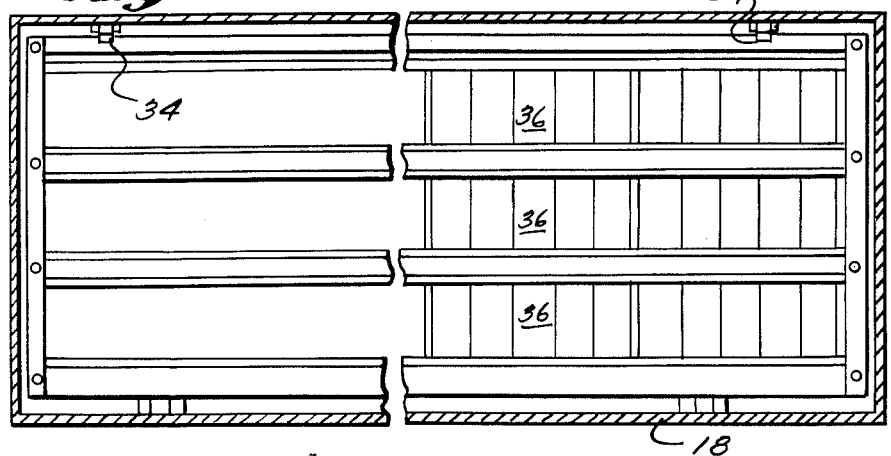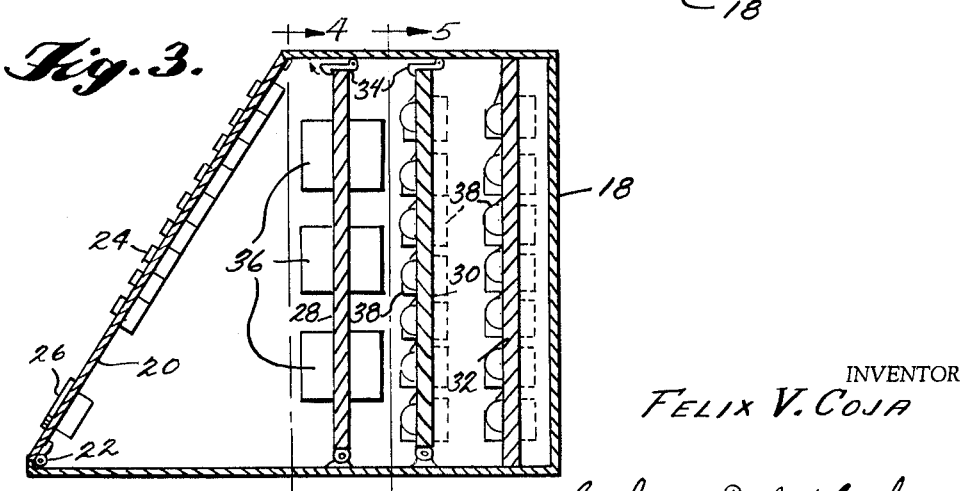

Jan. 4, 1966 F. V. COJA 3,227,367
REMOTE CONTROL SYSTEM FOR MANIPULATING A BUSINESS MACHINE
Filed Aug. 19, 1963 6 Sheets-Sheet 4

INVENTOR
FELIX V. COJA
BY Cushman, Darby & Cushman
ATTORNEYS

Jan. 4, 1966 F. V. COJA 3,227,367
REMOTE CONTROL SYSTEM FOR MANIPULATING A BUSINESS MACHINE
Filed Aug. 19, 1963 6 Sheets-Sheet 5

INVENTOR
*FELIX V. COJA*

BY *Cushman, Darby & Cushman*
ATTORNEYS

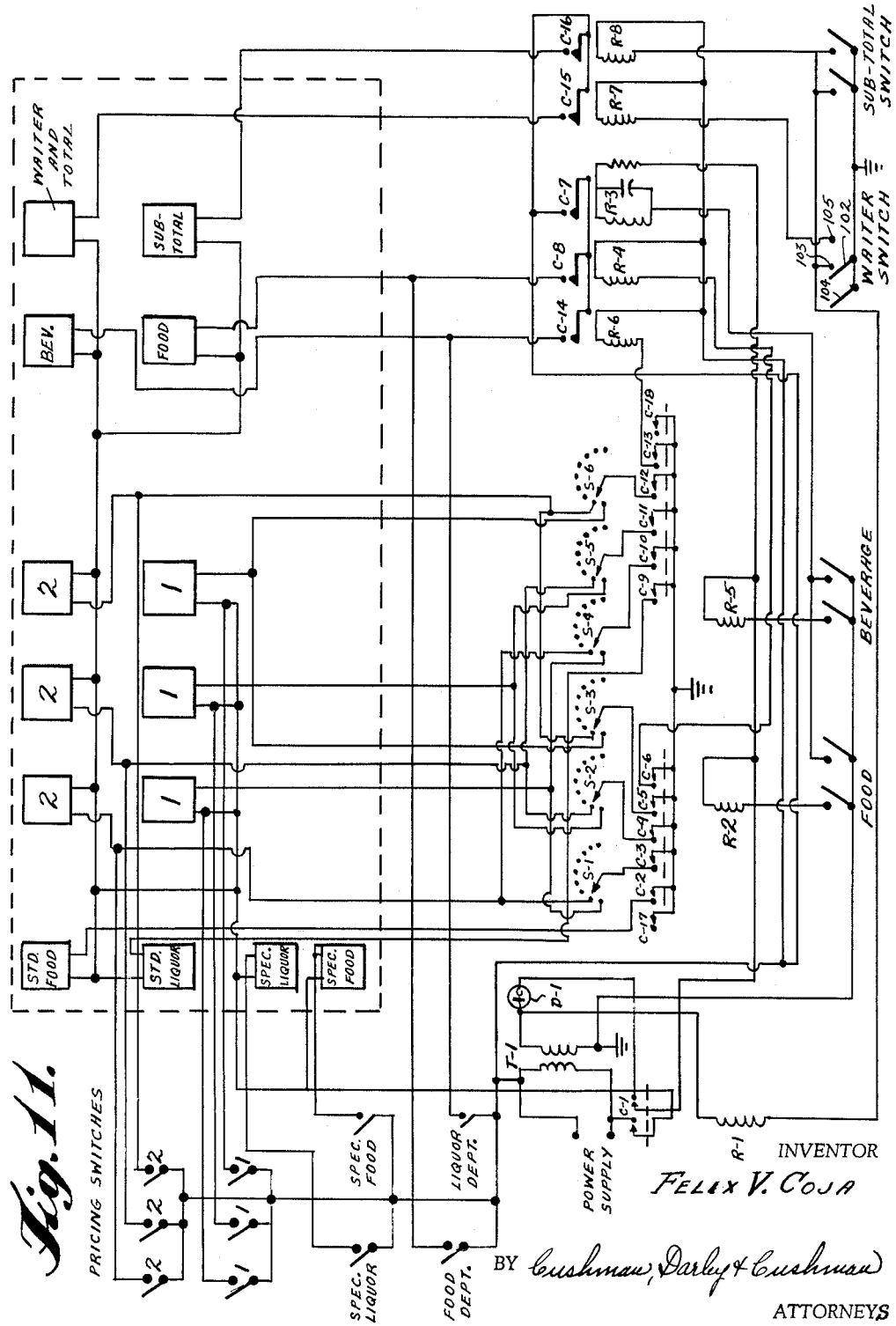

United States Patent Office 3,227,367
Patented Jan. 4, 1966

3,227,367
REMOTE CONTROL SYSTEM FOR MANIPULATING A BUSINESS MACHINE
Felix V. Coja, 1523 22nd St. NW., Washington, D.C.
Filed Aug. 19, 1963, Ser. No. 303,079
2 Claims. (Cl. 235—146)

This invention relates to an operative system for business machines and, more particularly, to a remote control arrangement for manipulating a business machine, such as a cash register, either manually or in conformity with a preselected program.

The system of the invention is particularly useful in the restaurant business wherein a number of items are ordered by the customer and these must be identified, priced and totaled on a check before charging the customer for the food and beverages served. Therefore, the invention will, for purposes of illustration, be described with reference to the restaurant business.

In one system in general use, the waiter writes on a check the order of the customer and beside each item he records the price. Before the customer leaves the waiter tallies the items to obtain a final total which is then submitted to the customer, who pays the waiter, or a cashier. This total is then manually applied to a cash register so that the proprietor will have recorded therein the amount of each sale. In this manner the net proceeds of a business period are available in the register. However, this commonly employed system has a number of drawbacks. Among these are the requirement that the waiter expend time for writing the orders on the check, recording the prices, and then adding the check to determine the charges. These operative steps by the waiter present frequent occasions for error which results in a loss to either the proprietor or to the customer. Furthermore, the cash register must also be manipulated in accordance with the information on the check and this process is not only time consuming, but also serves as another opportunity for error.

An alternative arrangement employed in many restaurants is a system wherein the waiter records the orders and submits his check to the cashier who places it in the cash register and manually records the price of the individual items by manipulating the register keyboard. The check is subsequently stamped with the total of the individual items ordered. Although this system eliminates the requirements that the waiter record and add the prices, thereby directing this function to a cashier who is likely to be more accurate, nonetheless the opportunities for error are still prevalent and the necessity of utilizing both a waiter and a cashier is not eliminated.

The invention overcomes many disadvantages of the prior art arrangements by providing a system wherein entry of an order automatically performs the steps of printing on the check the identity of each product sold and the price thereof, and, on completion of the entry of the individual items, serves to add the individual prices to record on the check the total charge.

It is a principal object of this invention to provide a remote control system whereby the functions of entering orders, the prices of each item of the order and totalizing the order is automatically accomplished by a remote control unit which is operatively connected to manipulate a cash register.

Another object of the invention is to eliminate direct manual operation of the cash register keys while manipulating the register.

A further object is to provide a console remote from the cash register having a keyboard with buttons corresponding to a preselected program whereby the actuation of a single button results in the pricing and identification of an item on a sales slip within the register.

A further object is to provide a remote control system whereby the console may be placed at any convenient location with respect to the cash register thereby improving the efficiency of operation of the service facilities of the establishment.

An additional object, ancillary to the foregoing objects, is to provide a remote control system which increases the speed of operation of the cash register while simultaneously eliminating the need for writing orders and adding a check thereby reducing the requirements for waiters and a cashier.

A further object is to provide an arrangement for manipulating a business machine, such as a cash register, from a remote location either manually for special items or automatically for standard items.

Another object is to provide a remote control arrangement having capabilities for interconnecting the arrangement for manipulating the cash register to an inventory control system whereby a running count of the items ordered, and their relationship with the remaining number of items in stock, etc. may be determined.

Further objects and the entire scope of the invention will become more fully apparent when considered in light of the following detailed description of an illustrative embodiment of this invention and from the appended claims.

The illustrative embodiment may be best understood by reference to the accompanying drawings wherein:

FIGURE 3 is a vertical sectional side view of the remote console taken along line 3—3 of FIGURE 1;

FIGURE 4 is a vertical sectional front view of the console taken along line 4—4 of FIGURE 3;

FIGURE 5 is a vertical sectional front view of the remote console taken along line 5—5 of FIGURE 3;

FIGURE 11 is a schematic electrical diagram illustrating the electrical system employed in actuating the electro-mechanical arrangements for manipulating the keys of the cash register.

The remote control system for manipulating a business machine will be described, for illustrative purposes, as being applicable to the operation of a cash register from a remote location. As stated previously, the cash register may be operated either manually or in conformity with a preselected program. Briefly, the invention comprises a remote console which is electrically interconnected with a converter which is operatively associated with the cash register to manipulate the keys thereof. The converter portion comprises a plurality of solenoids which are energized by signals generated at the remote console to appropriately depress selected keys of the register. The console itself is divided into two portions. One of these portions is utilized to order standard items for which a pricing program is provided in the console. The other portion of the console is utilized to order special items wherein the items are ordered in a manner similar to that which would be employed if the operator were at the cash register itself manipulating it manually rather than remotely.

When utilizing the completely automatic portions of the console, a push button is provided for each of the standard items, this button being depressed to actuate an electrical circuit which includes an item identifying solenoid within the converter. A direct connection exists between the button depressed and the solenoid in the converter which identifies the item to appropriately depress the cash register key associated with this solenoid thereby marking the sales slip with the identity of the item ordered. Simultaneously, the depression of this automatic selection button also completes circuits through adjustable price establishing switches in the console to the appropriate key actuating solenoids of the converter which manipulate the pricing buttons of the cash register to record the price of the item selected on the sales slip.

When a special item is ordered, the remaining portion of the console is utilized, there being a direct connection from the console to the key manipulating solenoids so that depression of the former is merely a duplication of the process which would be involved if the item were to be manually selected on the cash register. In this sense, the ordering of specialty items is very similar to arrangements known in the prior art. However, with regard to standard items, the operation is completely automatic being dependent only on the depression of a button at the console corresponding to the item ordered.

When all of the items of an order are entered, the operator actuates another switch to directly energize appropriate solenoids in the converter to identify the operator while simultaneously printing the total price of the order on the sales slip.

Figure 1:
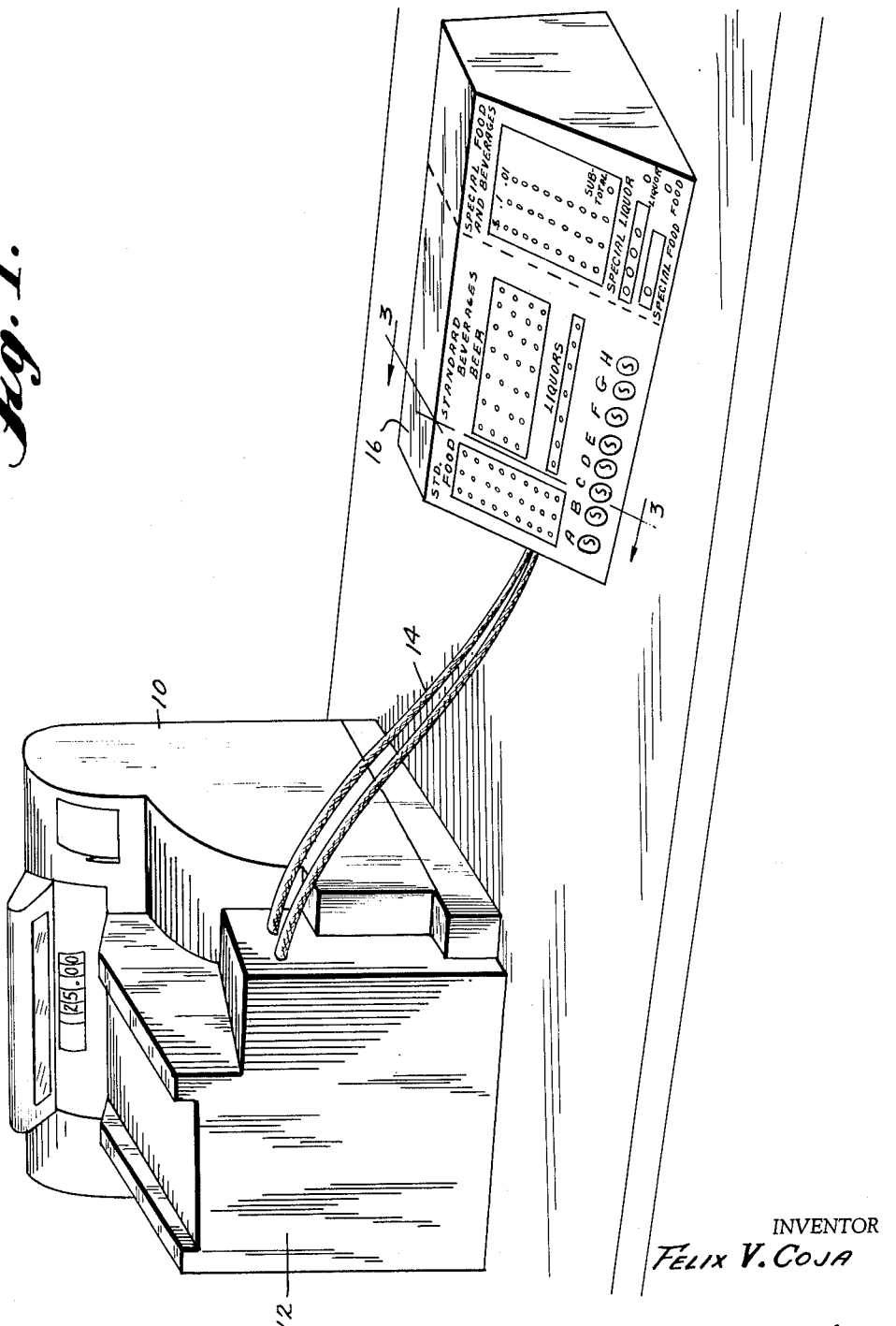
FIGURE 1 is a view in perspective of a remote control arrangement for manipulating a cash register.

Referring to the drawings, the illustrative embodiment of the invention may be described. In FIGURE 1, there is illustrated a conventional cash register 10 which is to be manipulated by the remote control system. Compactly aligned with the register to cover the keyboard thereof while providing access to the register display and sales slip exit, is a converter, the housing 12 of which is illustrated. Suitable cable means 14 interconnect the converter and a remote console indicated generally at 16. On the face of the console are illustrated a plurality of buttons which are depressed by the waiter entering the order, it being assumed, as stated previously, that the illustrative embodiment is employed in a restaurant environment. It will also be assumed that the restaurant offers both standard and special foods and beverages and that the keys of the console are appropriately labeled to indicate the items sold.

In the drawing of the illustrative embodiment, the console 16 is divided into two portions by the dashed line which is included only for purposes of illustration to indicate that that portion of the console to the left of the line is concerned with the standard items, whereas the portion to the right deals only in the specialty items. It will become apparent that the capabilities of the remote control system for performing the identifying functions are dependent upon the number of the keys of the cash register available for appropriately marking the sales slip to identify the items. For example, if twenty items are offered by the restaurant for sale, there must be a sufficient number of keys on the cash register to record the items in a code convenient to the management. This may be done by providing a separate key for each item or by grouping the items and providing a key for each group thereby reducing the requirement to less than twenty keys.

In the example illustrated, the portion of the keyboard for standard items is divided into three push button areas. One of these is used to enter orders for standard food items, and the other two are employed for recording orders of standard beverages, the larger for beer and the smaller for liquors. In this portion of the console assigned to standard food and beverages, the food section is divided into three vertical rows of buttons, each row of the three representing a different grouping, or sub-department, of food with the nine vertically arranged buttons in each row representing various quantities of each item of food. Similarly, the beer push button area of the standard beverage section is divided into seven standard groupings, each represented by a row of buttons, with the vertical orientation representing a different quantity of each of the items. The liquor push button area comprises one group having different price levels as will hereinafter be explained.

The portion to the right of the dotted line on the console of FIGURE 1 is also divided into three push button areas. This portion is directed to special food and beverages and is similar to the cash register since the principal push button area is a keyboard on which the prices of the specialty items are entered. The three complete rows constituting this main section of the principal portion represent, from left to right, dollars, tenths of dollars, and cents and are employed to register the price of specialty items on the cash register in a manner to be explained hereinafter. The single button in the main section is operatively connected to a solenoid in the converter to energize the subtotal key of the cash register. The remaining two sections of this portion of the console are directed respectively to specialty liquors and food.

In the arrangement of this exemplary embodiment, a code or grouping of the products offered by the restaurant has been arbitrarily selected. In the cash register selected for purposes of illustration, two rows of nine keys each have been designated to perform the product identity. One of these rows has been designated as a Department row and the other as a Sub-Department row. As stated previously, there are seven standard beers represented on the console. These have been arbitrarily designated as comprising seven departments having no sub-departments. Therefore, to identify each of the beer departments, seven of the nine keys in the Department row must be utilized. This leaves two keys for further department designation. Since the remaining products of the example are standard and special liquors, and standard and special foods, the remaining two departments have been identified as the food department and the liquor department. Therefore, to distinguish between special and standard items of each commodity, the Sub-Department row is employed. In the example, the console is adapted for three groupings, or sub-departments, of standard foods. Accordingly, three of the nine keys of the Sub-Department row are assigned to standard foods. Since the standard liquor section of the console has push buttons for liquors varying only in price, it is convenient to identify standard liquors as being only one sub-department of the liquor department. In the special liquor section of the console, four push buttons are illustrated. These have each been designated as being associated with separate sub-departments. The remaining sub-department key of the register is associated with the special food section of the console having one button, as shown.

In acordance with the arbitrary coding scheme selected for illustration it is obvious that when a beer selection is made, only one push button need be depressed since beer is identified by department only. However, when the remaining items are entered on the console, two buttons must be actuated in order to manipulate the department and sub-department keys of the register. Therefore, the extreme right-hand portion of the console is provided with liquor and food push buttons which are operatively associated with the respective department keys.

The remaining visible elements on the console are key lock devices. Each of the waiters is assigned a lock position and is given a key which will fit only that lock. Accordingly, when he desires to enter an order, he must insert his key into the appropriate lock to turn the system on thereby providing power by which the cash register may be remotely operated. In accordance with the particular system employed and the capabilities of the cash register used in this example, eight waiter positions are shown. The locks are of the type having two ON positions. In the first ON position, power is supplied to the system to allow items to be registered. In the second position, the individual items entered are totalized and the waiter identified. The manner by which this is accomplished will be described in detail hereinafter.

Figure 2:
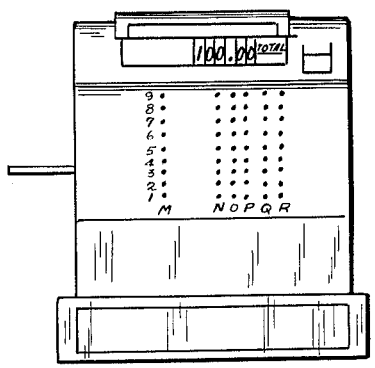
FIGURE 2 is a front elevation view of a conventional cash register illustrating the keys which are manipulated by the remote control system of the invention.

In FIGURE 2, there is illustrated a conventional cash register without the converter attached thereto. This illustration has been included in order that there may be clearly described the operation of the keys of the register in response to actuation of the buttons at the control panel. The register shown has a keyboard comprising six vertical rows of keys with nine keys in each of the rows. The left-hand row, M, and the two right-hand rows, Q and R, serve to print on the sales slip when depressed, the printing in rows M and Q being an indication respectively of the sub-department and department identifying the standard or specialty items and the printing in row R identifying the waiters and the total or the sub-total. The three centrally grouped vertical rows N, O and P serve as the numeric keys for printing the price of the items on the cash slips and are, from left to right, associated with dollars, tenths of dollars and cents in designating the price. The row Q also serves to actuate a cumulative memory within the cash register whereby totals of department sales may be obtained by manipulation of other elements of the cash register (not shown). However, the arrangement for obtaining these departmental totals is involved in the internal workings of the register and is not part of the invention. Therefore, the details of operation for this feature need not be described.

Referring more specifically to the individual keys of rows M through R, the keys of each row from bottom to top are designated by the numerals 1 to 9. In Sub-Department row M, key 1 is designated as the special food key and keys 2 through 5 are designated as the special liquor keys associated with the corresponding key positions on the console. Position 6 is designated as the standard liquor key and keys 7 through 9 are designated as the standard food keys corresponding to the three vertical rows of buttons on the console. As stated previously, rows N through P designate the pricing keys in dollars, tenths of dollars and cents, respectively. The nine keys of the Department row Q are divided as follows: key position 1 is designated for food, both special and standard, and position 2 is directed to specialty and standard liquors. Keys 3 through 9 are allocated to the standard beers. Key position 1 of row R is the sub-total key and the remaining eight keys are associated respectively with each of the eight waiters and the totalizing of the individual sales of these waiters. In operating this system, when a standard beer is ordered, the appropriate key of Department row Q is depressed to print the identity of the beer on the sales slip. When a standard food item is ordered, the key in position 1 of the Q row and the appropriate key in the 7 through 9 position of Sub-Department row M is also actuated. Similarly, when a specialty food is ordered, key 1 of row M and key 1 of row Q are depressed. When a special liquor is ordered, the appropriate one of keys 2 through 5 of row M and key 2 of row Q is depressed, and when a standard liquor is ordered, key 2 of row Q and key 6 of row M are actuated. The actuation of any of the keys in rows M or Q produces the corresponding actuation of the appropriate keys of rows N through P when a standard item is ordered, as will be described more completely hereinafter, and when a specialty item is entered, keys in rows N through P must be selectively depressed before the cash register will operate to print the price of the item on the sales slip. After the keyboard has been properly actuated to record a number of items, the total may be obtained and the waiter identified by actuating the combined waiter identity and totalizer key of row R. This information is printed to complete the sales slip for the particular sale.

Now that the overall system has been described, it should be re-emphasized that the arrangement of the keys with respect to the buttons of the remote console is simply one of convenience rather than limiting the application of a register to the console. Any other convenient arrangement by which the products are coded may be established depending on the nature of the products to be sold, the capabilities of the cash register, etc.

Referring to Figures 3 through 5, the physical structure of the remote console may be described. The console comprises a main housing 18 having an inclined front panel 20 attached thereto by hinge means 22, the panel being pivotally connected to housing 18 at 22 to permit access to the interior of the housing. Mounted on the inclined panel 20 are a plurality of push buttons 24, these push buttons, in the sectional view of FIGURE 3, corresponding to the push buttons of the standard food section of the console. Also attached to the panel 20 is a lock device 26 which corresponds to lock position B of FIGURE 1. Within the interior of the console are provided support members 28, 30 and 32. Members 28 and 30 are hingedly connected to the bottom of the console housing 18. Suitable catch devices 34 are mounted to the tops of housing 18 to normally hold the support members 28 and 30 in a vertical position but which allows these members to be disengaged therefrom to pivot to thereby permit access to the elements mounted on support members 30 and 32. Attached to support member 28 are a plurality of multi-contact relays 36 to be described hereinafter in detail with relation to the schematic electrical diagram of FIGURE 11. Attached to support members 30 and 32 are a plurality of multi-position switches 38 which are employed to set the prices of each of the standard items. Utilizing this console structure, the prices of the standard items may easily be changed by opening the front panel 20 of the console and successively releasing supports 28 and 30 in order that the switches 38 attached to supports 30 and 32 may be adjusted to different positions. In FIGURE 4, the distribution of the relays 36 along the frame which comprises support member 28 can be seen. Similarly, in FIGURE 5 there is illustrated a portion of the switching arrangement comprising switches 38 which are connected to the support member 30, which member, along with support member 32, comprise perforated plates having a number of switches mounted within the perforations.

In FIGURES 3 through 5, the electrical connections between the push buttons, the relays and the multi-position switches have been eliminated for convenience of illustration. It will be understood that the switches 38 are grouped in threes to conveniently allow price settings for each of the standard items.

Before proceeding with the description of the converter portion of the system, an additional feature of the cash register employed in the illustrative embodiment should be noted. As stated previously, the register includes six vertical rows of keys. Four of these rows may be manipulated by the application of a force of low pressure whereas two of the rows require an appreciable force to press the keys. This requirement of additional force prevents accidental entry of information on the register since the keys of these latter rows must be depressed before the register can operate. More specifically, rows M through P can be operated with a low application of force, whereas rows Q and R are appreciably more difficult to actuate. Accordingly, the invention includes a unique arrangement for selecting the keys of rows Q and R and manipulating them by a relatively large force with a single high powered solenoid while utilizing individual smaller solenoids for each of the keys in rows M through P. FIGURES 6 through 10 illustrate the arrangement wherein a selected key in rows Q and R is manipulated.

Figure 6:
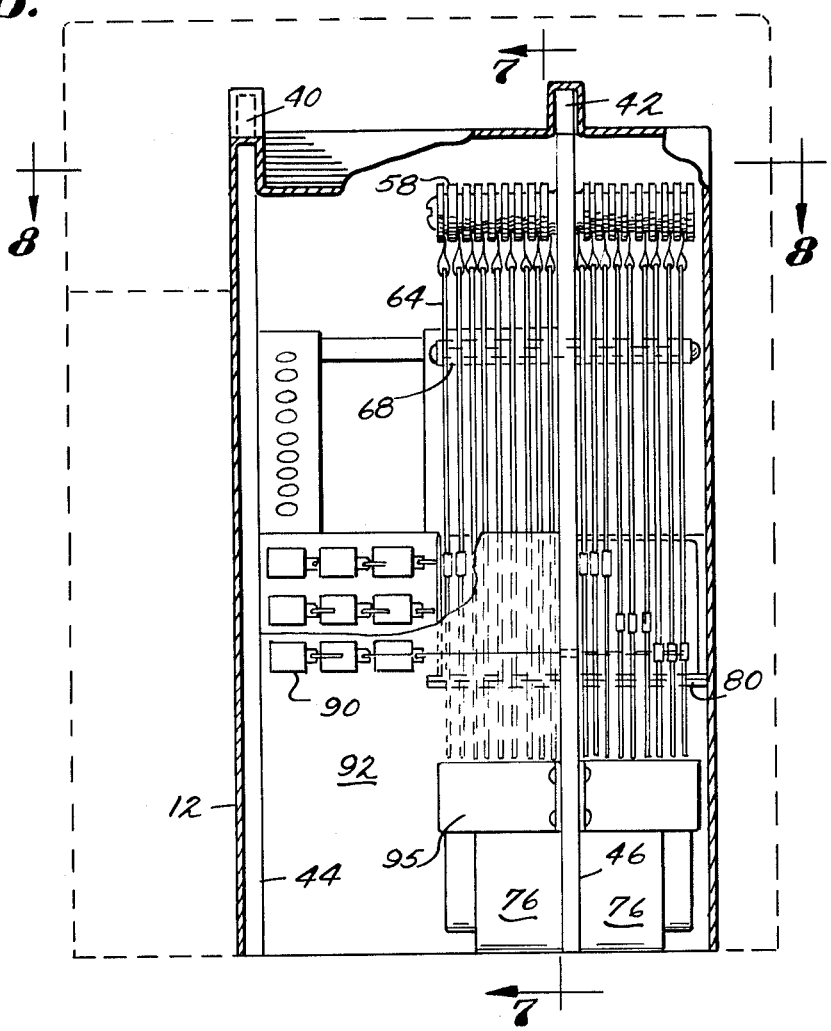
FIGURE 6 is a fragmentary vertical sectional view of a portion of the electro-mechanical actuating arrangement for manipulating the keys of the cash register.
Figure 7:
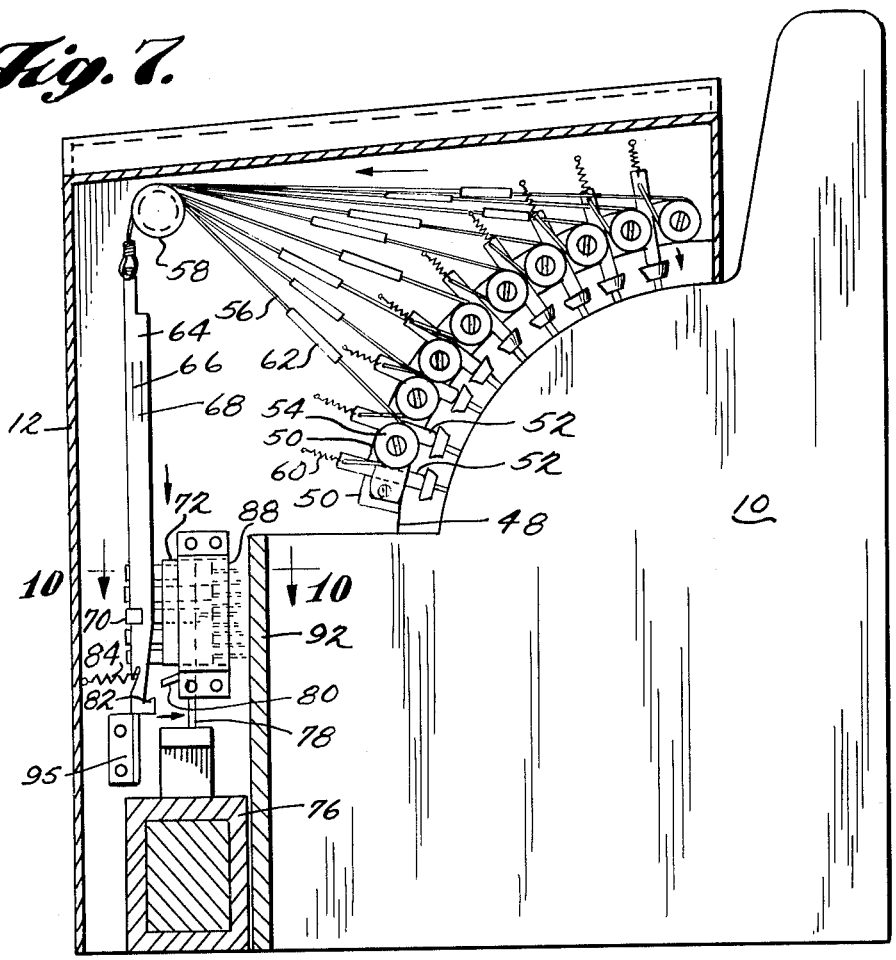
FIGURE 7 is a vertical sectional side view of the key manipulating electro-mechanical arrangement taken substantially along line 7—7 of FIGURE 6.
Figure 9:
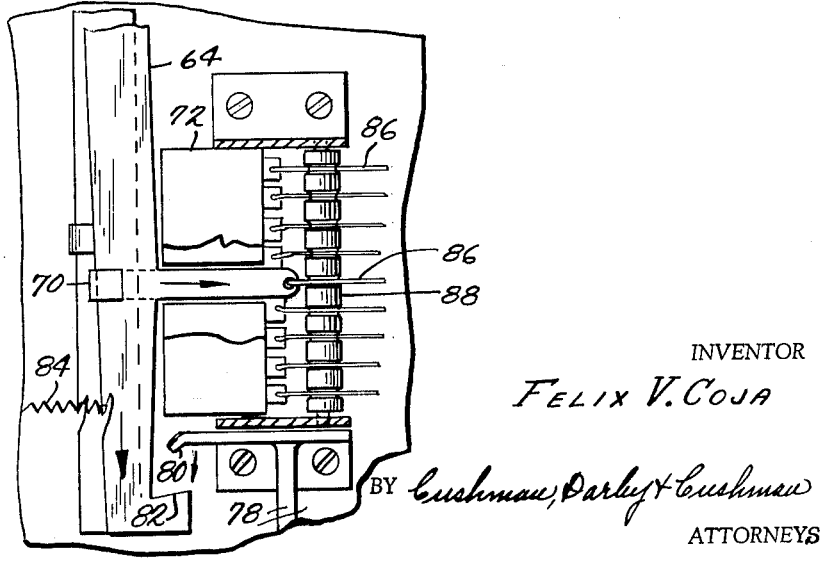
FIGURE 9 is an enlarged fragmentary view of a portion of the apparatus shown in FIGURE 7, this portion illustrating the key manipulation arrangement in its operative position.
Figure 10:
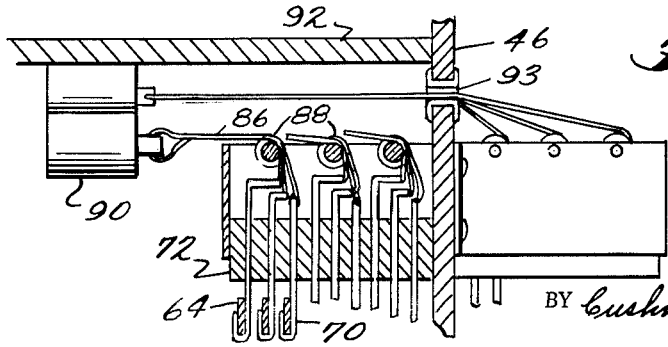
FIGURE 10 is an enlarged fragmentary horizontal sectional top view of a portion of the key manipulating arrangement taken along line 10—10 of FIGURE 7.

In FIGURE 7, the keys 1 through 9 of row Q are illustrated, the cash register 10 being generally outlined in the drawing. The converter 12 includes a housing which has formed in the upper surface thereof a pair of spaced cavities 40 and 42 within which are positioned vertical support elements 44 and 46. The element 44 serves as a base for individual solenoids associated with the keys of rows M through P in a manner to be hereinafter described. The vertical support 46 is positioned intermediate the rows Q and R of the register keyboard. This vertical element 46 serves to support virtually identical operating units for manipulating the keys of rows Q and R. Only the unit for the keys of row Q will be described in detail. These units are positioned on opposite sides of the support element 46 and are mounted symmetrically with respect thereto. Connected to the support element 46 along an arcuate edge 48 thereof, the curve of this edge corresponding in contour to the curve defined by the top surfaces of the keys of the cash register, is provided a plurality of spaced metallic plate segments 50. These segments serve to support and guide key manipulating plungers 52. The spaces between segments 50 serve as guides, there being nine spaces between the elements 50 to allow nine plungers to be positioned with respect to the keys of row Q and slidably move into and out of contact with the keys. Attached to each of the plate segments 50, with the exception of the lowermost one is a pulley 54, as shown. Wires 56, connected to the ends of plungers 52 opposite those ends adjacent the keys of row Q, are passed about these pulleys to a common pulley 58 attached to the vertical support element 46 (not shown). The plungers 52 are biased out of contact with the keys by springs 60 attached to the vertical support element 46. Connected intermediate the single pulley 54 and the common pulley 58 are tensioning devices 62 which appropriately tension the wires 56. Each of the wires 56 passes about the common pulley 58 and is connected to one end of respective vertically extending pawl members 64. These pawl members are mounted in spaced relationship in a generally parallel fashion with respect to the support element 46. Within the pawl 64 is a vertically extending slot 66 which allows the pawl to move in a vertical direction as will be hereinafter described. Passing through slot 66 is a stationary guide pin 68 which is connected to the vertical support element 46. The pawls 64 are supported at their lower ends by means of generally J-shaped elements 70 laterally movable within a support block 72 fixed to the vertical support element 46. Positioned below the support block 72 is a solenoid 76 having a vertically movable armature 78 provided with a hooked portion 80 at its upper end. On energization of the solenoid, armature 78 is drawn downwardly. Provided at the lower end of pawls 64 are notches 82 which face the extending portion 80 of the armature 74 but are normally spaced therefrom by means of tension springs 84 which are connected to the support element 46. Joined to the opposite ends of the laterally movable J-shaped members 70 from the ends guiding the pawls 64 are wires 86, shown in FIGURE 9, which pass about pulleys 88 and are connected at their opposite ends to the armature of individual solenoids 90 shown in FIGURE 6. These solenoids are mounted on a vertical support plate 92 extending between the support elements 44 and 46. As will be readily understood, nine of these solenoids are provided for row Q and nine for row R such that each pawl associated with the keys of rows Q and R may be individually actuated in the manner to be described. All of these solenoids are mounted on the same side of support element 46, the wires 86 to the J-shaped members associated with the R row passing through an orifice 93 in element 46 (FIGURES 6 and 10).

When an appropriate button is pushed on the remote console, or when a locking device is turned to its second ON position, one of the solenoids 90 is energized to apply tension to its respective wire 86, thereby horizontally displacing the corresponding J-shaped element 70 to move pawl 64 against the tension applied by its associated spring 84 thereby moving the notch 82 of pawl 64 into the path of motion of the armature of solenoid 76. Solenoid 76 is also appropriately energized by the circuit completion at the remote console such that the armature 78 is drawn downwardly allowing its hooked portion 80 to engage the notch 82 of the selected pawl 64 thereby vertically displacing the pawl. As this pawl is displaced, tension is applied to the associated wire 56, the force on wire 56 being applied to the upper end of the respective plunger 52 thereby displacing the latter with respect to its associated spring 60 to depress the appropriate key of the cash register. As the solenoid 76 is de-energized, its armature moves upwardly thereby releasing the tension on wire 56 allowing the pawl 64 to move upwardly under the action of spring 60. Simultaneously with the de-energization of solenoid 76, the selected solenoid 90 is also de-energized allowing the spring 84 to move the selected pawl laterally out of the path of the armatuure 78 thereby preparing the machine for the next cycle. Of course, with the release of pawl 64, the spring 60 also returns the plunger to its initial condition out of engagement with the keys.

To prevent an unselected pawl from accidentally being depressed to actuate a key, stop means 95 is mounted beneath the pawls to the vertical support element 46.

Figure 8:
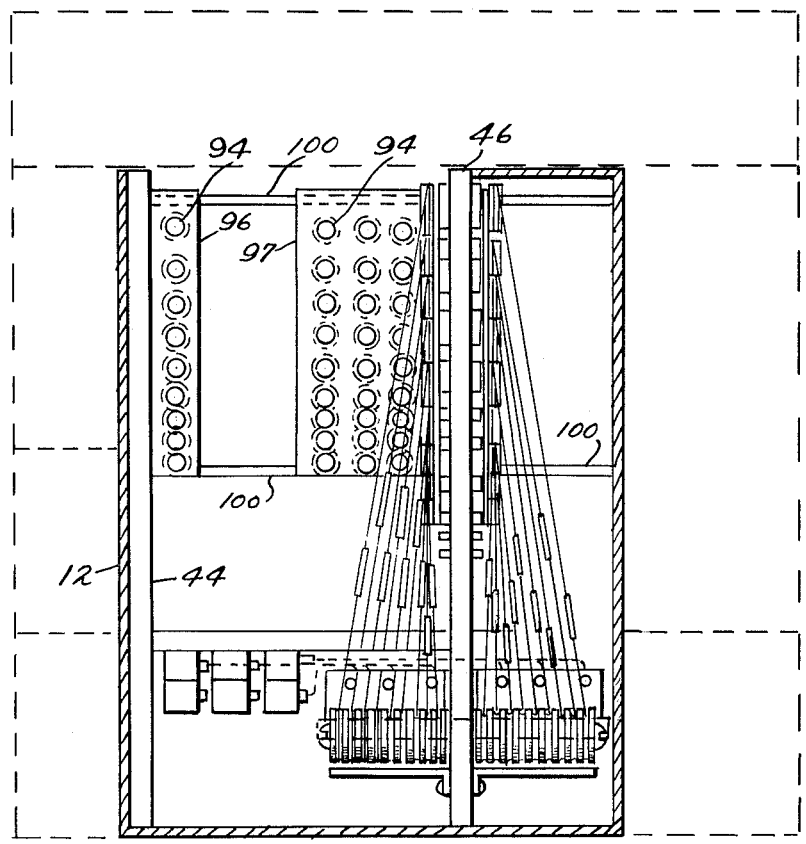
FIGURE 8 is a fragmentary horizontal sectional top view of a portion of the electro-mechanical key manipulating arrangement taken along line 8—8 of FIGURE 6.

In FIGURE 8 there is broadly illustrated the manner of manipulating the remaining keys of the register, these keys comprising those in rows M through P as shown in FIGURE 2. As stated previously, these keys are actuated directly by the energization of individual solenoids associated with each of the keys, these solenoids being positioned within converter 12. These individual solenoids are mounted directly above the keys and are illustrated generally at 94 in FIGURE 8, the solenoids being connected to support plates 96 and 97 mounted across frame members 100 within the converter housing. Once again, in FIGURES 6 through 10, the electrical wiring of these solenoids 76 and 90 has been eliminated for convenience of illustration.

Although the actuating arrangement for rows Q and R has been described with reference to row Q only, from the drawings, especially FIGURE 8, the relationship between the actuating arrangement for row Q and that for row R can be seen, these actuating arrangements being virtually identical and symmetrical with respect to vertical support element 46.

Now that the structure of the remote console and the converter has been described and related to the particular cash register which has been selected for purposes of illustration, the electrical operation of the system will be set forth with reference to FIGURE 11. Once again, it should be emphasized that the programmed arrangement is illustrative only, and that any desired arrangement for both manual and automatic remote control of the cash register may be employed depending on the capabilities of the machines being manipulated. The illustrated grouping sets forth the various combinations by which the keys of the register may be actuated from a remote location.

In the illustrative arrangement of FIGURE 11, a number of simplifications have been made in order to condense the electrical diagram to one which readily lends itself to explanation. These simplifications will hereinafter be described.

For purposes of convenience, the various solenoids of the converter have been illustrated as blocks and are located within the dash line which represents the converter 12. By referring to FIGURE 11, it will be seen that the solenoids are oriented in rows in the same relative manner as rows M through R of the register keyboard. The block representing the Standard Food solenoids relates to key positions 7 through 9 of row M, the Standard Liquor solenoid serves to operate key 6 of this row, the block representing the Special Liquor solenoids is associated with keys 2 through 5 and the Special Liquor solenoid operates key 1 of row M. With respect to rows N, O and P, only the solenoids associated with key positions 1 and 2 are represented, and it will be obvious that by further expansion of the circuit diagram, the entire pricing system may be developed. Referring to row Q, the block designated as the Food solenoid relates to key position 1, and the block designating the Beverage solenoids relates to key positions 2 through 9. The Sub-Total solenoid is associated with the first key position of row R and the block representing the combined Waiter and Total solenoids is associated with the remaining keys of this row. It should here be noted that the description of FIGURES 6 through 10 describes the use of a single solenoid 76 to operate all the keys in rows Q and R, the selection being made by appropriately energizing the solenoids 90 for moving the pawl 64 into the path of the solenoid 76. In FIGURE 11, the Beverage, Food, combined Waiter and Total, and Sub-Total solenoids shown in block form represent the solenoids 90 and solenoid 76, the energization of both of which is necessary to actuate keys in rows Q and R.

Referring to FIGURE 11 in detail, a power supply is coupled by transformer T–1 to the operating mechanism of the remote console. This mechanism includes a number of switches which are selectively operated by the waiter entering the order to register the order on the cash register which is remote from the waiter. The power to the console is controlled by the position of the two ON position switch which is labeled as the Waiter switch. Although only one such switch is shown, it is apparent that in this example eight Waiter switches are actually employed, one for each waiter. In the open position of this switch, no power is applied to the solenoids. However, when the switch is moved to the first ON position wherein arm 102 engages contact 103, a path is closed between one side of the secondary winding of T–1 through a relay winding R–1 to ground. The energization of R–1 closes its associated double contacts C–1 to connect the power supply to one side of the solenoid windings throughout the converter. The system is now ready for an order to be entered therein. To enter an order for a standard item, the Food or Beverage switch is actuated. These switches represent the several push-buttons which are located in the standard portion of the console, as illustrated in FIGURE 1.

Assuming first that the waiter enters an order for a standard item of food, the Food switch is closed to complete a circuit through multi-contact relay R–2. R–2 is supplied with a direct current due to the positioning of a rectifier D–1 in the secondary winding circuit of transformer T–1. The energization of relay R–2 closes its contacts C–2 through C–6. Closure of contact C–2 completes a circuit through the Standard Food solenoid associated with row M. Therefore, one of the keys 7 through 9, depending on which of the food switches was actually actuated by the waiter, is energized to manipulate this key. Contacts C–3 through C–5 are connected respectively through multi-position switches S–1 through S–3, corresponding to switches 38 in FIGURES 3–5, to the solenoids actuating rows N through P of the cash register, S–1 being directed to the dollar positions of row N, S–2 to the tenths of dollar positions of row O, and S–3 to the cents positions of row P. Depending on the settings of switches S–1 through S–3, the appropriate solenoids to record on the sales slip the programmed price are energized thereby manipulating the associated keys in rows N through P. The energization of the solenoids relating to rows M through P occur simultaneously to thereby manipulate the keys at the same time. However, in the design of cash registers such as the one utilized in this example, it may be impossible to manipulate the keys in rows Q at the same time as the keys in rows M through P are actuated. As a result the machine is prevented from functioning when keys in all of the rows are manipulated simultaneously. To provide for this design in the system of the invention, a time delay circuit is employed to control the operation of the keys in rows Q with relation to those in rows M through P. This is accomplished by placing a condenser in parallel with the relay winding of a relay R–3 which controls the application of power to the solenoids in row Q through its associated contact C–7 in a manner which will now be described. When the waiter has depressed the Food switch, a circuit to relay R–4 is completed through contact C–6 associated with the multi-contact relay R–2. The energization of R–4 closes its contact C–8 but this does not complete a circuit to the food solenoid since contact C–7 remains open. Relay R–3 is directly connected to the secondary winding of transformer T–1 when the Food switch is closed and after a time lag, dictated by the values of the condenser in parallel with the relay winding and the resistor between the winding and the secondary of T–1, R–3 is energized sufficiently to close contact C–7 thereby completing a circuit to the Food solenoid resulting in its actuation a prescribed time after the solenoids associated with rows M through P have been energized. Accordingly, the sales slip has now been completely printed with the identification of the item ordered and its price. Since a standard food was selected, both a department key in row Q and a sub-department key in row M have been manipulated as well as those pricing keys of rows N through P. On release of the selected push button illustrated by the Food switch, the system is ready for entry of the next item.

It will be assumed in this connection that a standard beverage will be ordered next. Here the Beverage switch, representing the several standard beers or liquors push buttons, is actuated to energize multi-position relay winding R–5 which is a relay winding associated with a plurality of contacts C–9 through C–13. The energization of R–5 by the rectified current from the secondary winding of T–1 closes contacts C–9 through C–13. The closure of C–9 completes a circuit through the Standard Liquor solenoid associated with row M of the cash register keyboard. Similarly, rows N through P are actuated in accordance with the pricing code established on multi-position switches S–4 through S–6, the circuits to the respective solenoids through these switches being completed on closure of contacts C–10 through C–12. Just as in the case previously described, relay R–6 is energized when the standard switch, in this case the Beverage switch, is closed by the subsequent closure of contact C–13 when R–5 is energized. However, a circuit is not completed to the Beverage solenoid associated with row Q until the prescribed time delay occurs at which time C–7 closes to complete a circuit through C–7 and C–14, associated with R–6, to the appropriate Beverage solenoid. By this process, a standard beverage item is recorded and priced on the sales slip within the cash register. It will be obvious, of course, that since in the example utilized herein the several beers are not grouped into sub-departments, there will be no connections from the multi-contact relays associated with the beer push buttons on the remote console to the solenoids associated with row M. In the example just described, it has been assumed that the Beverage switch actuated was actually one of the standard liquor buttons which require actuation of department and sub-department identifying keys.

Now that the sequence of automatic operation has been described for entry of individual standard items, the manual operation for special items will be described. Just as in the case of the standard items, the positioning of arm 102 of the waiter switch in the first position whereby it engages contact 103 to connect one side of the solenoid windings to a power supply, is employed when the selection is to be manually performed. However, to complete the circuit to each of the solenoids, separate switches are provided to each of the solenoids associated with rows M through Q since all special items have been grouped in departments and sub-departments. Thus, if it is desired to record a particular item, such as a special liquor, the operator depresses Special Liquor switch and then manually enters the price by actuating the Pricing switches. By this procedure the sub-department is established in row M and the prices in rows N, O and P. Thereafter, the Liquor Department switch B is actuated to manipulate the corresponding key in row Q. Accordingly, all of the items necessary for identity and pricing of the specialty liquor item are entered on the sales slip by manipulation of these keys from the remote switches. By a similar procedure wherein the Special Food, Food Department and Pricing switches are actuated, a special food item is entered on the cash register.

When it is desired to total the individual items entered, the Waiter switch is thrown into its second ON position whereby arm 102 engages contact 105 and arm 104 engages contact 103. In this position, the power supplied to the solenoids is maintained as R-1 is still energized through a circuit passing from one side of the secondary winding through contact 103, arm 104 to ground. However, a circuit is also completed between ground through arm 102 and contact 105 to the relay R-7. Energization of R-7 closes contact C-15 to condition the combined Waiter and Total solenoid for actuation. On closure of C-15, a circuit is completed to energize the combined Waiter and Total solenoid thereby manipulating the appropriate key in row R to print the waiter identity and total information on the sales slip.

If at any time during the operation it is desired to obtain a sub-total, a single throw Sub-Total switch is employed to complete a circuit through relay R-8 having a corresponding contact C-16. Energization of R-8 by closure of the Sub-Total switch closes contact C-16 so that the Sub-Total solenoid may be energized.

It should here be again noted that each of the selection switches for standard food and beverages is shown as simply one switch. However, in the standard remote console, a separate switch, in the form of push buttons, similar to those generally labeled as Food and Beverage switches is provided for each item with corresponding multi-contact relays and multi-position switches associated with each. Similarly, a plurality of waiter switches is provided each being operative only on the insertion of a key in the appropriate waiter lock as shown on the perspective drawing of the console in FIGURE 1. The number of manual switches is completely dictated by the capability of the machine for identifying various items and the grouping arbitrarily selected to identify these items.

The relays R-2 and R-5 of FIGURE 11 have been illustrated as multi-contact relays having six contacts each. However, it can be seen that both R-2 and R-5 have unused contacts C-17 and C-18 respectively. These contacts may be employed to expand the system to perform other functions such as inventory control whereby a running count of the items ordered may be maintained at a remote location. These unused contacts, while illustrated as individual contacts, may actually be part of a larger multi-contact relay arrangement whereby other operations ancillary to the manipulation of the business machine are controlled by the operation of the console.

The above described embodiment is illustrative of a preferred embodiment of the invention but is not intended to limit the possibilities of insuring automatic and manual control of the manipulation of a business machine from a remote location in conformity with a preselected program or selectively as dictated by special requirements.

The control system disclosed herein is an example of an arrangement in which the inventive features of the disclosure may be utilized, and it will become apparent to one skilled in the art that certain modifications may be made in accordance with the features of the machine to be manipulated and the information which will be programmed, which modifications are within the spirit of the invention as defined by the appended claims.

What is claimed is:

1. In an arrangement for manipulating the keys of a cash register keyboard from a remote location to enter and display information therein: a remote control console, converter means interconnected with said console and operatively related to said keyboard, means at said console for pre-programming information and for manually selecting information for transmission in the form of electrical signals to said converter means, said converter means being responsive to said information to manipulate the keyboard in conformity with the information; said converter including a plunger positioned immediately adjacent each of said keys, spring means attached to each of said plungers for normally biasing them out of operational contact with said keys, pulleys means supported within said converter, a flexible cable associated with each of said plungers by connection at one end thereto, said cables passing about said pulley means and being connected at their free ends to movable pawl means, a solenoid having a movable armature positioned remote from said keyboard, means for normally retaining said pawl means out of the path of movement of said armature, and means for selectively displacing said pawl means in response to the transmitted electrical signals into the path of movement of said armature to be engaged thereby to move said pawl means and selected plungers to actuate associated keys to enter and display information in the register.

2. An arrangement for manipulating the keys of a cash register keyboard as defined in claim 1, wherein said movable pawl means comprises a plurality of pawls each being joined by a flexible cable at an associated plunger and further including additional solenoid means for selectively displacing said pawls for engagement with the armature.

References Cited by the Examiner

UNITED STATES PATENTS

| 982,938 | 1/1911 | Cleal. | |
| 2,014,432 | 9/1935 | Gerhold | 235—146 |
| 2,070,824 | 2/1937 | Boutet | 235—204 |
| 2,293,127 | 8/1942 | Fishack et al. | 235—145 |
| 2,332,304 | 10/1943 | Davies. | |
| 2,386,482 | 10/1945 | Leathers et al. | |
| 2,469,754 | 5/1949 | Tierney | 235—146 |

FOREIGN PATENTS 331,182  6/1930  Great Britain.

LEO SMILOW, *Primary Examiner.*